United States Patent
Dain et al.

(10) Patent No.: US 11,704,279 B2
(45) Date of Patent: Jul. 18, 2023

(54) EVENT DRIVEN MIGRATION, RECALL, AND DATA PLACEMENT OPTIMIZATION BASED ON CUSTOM METADATA

(71) Applicant: International Business Machines Corporation, Armonk, NY (US)

(72) Inventors: Joseph Dain, Vail, AZ (US); Nilesh Prabhakar Bhosale, Pune (IN); Takeshi Ishimoto, Kawasaki (JP)

(73) Assignee: International Business Machines Corporation, Armonk, NY (US)

(*) Notice: Subject to any disclaimer, the term of this patent is extended or adjusted under 35 U.S.C. 154(b) by 511 days.

(21) Appl. No.: 16/661,914

(22) Filed: Oct. 23, 2019

(65) Prior Publication Data

US 2021/0124713 A1   Apr. 29, 2021

(51) Int. Cl.
  *G06F 16/11* (2019.01)
  *G06F 16/16* (2019.01)
  *G06F 3/06* (2006.01)

(52) U.S. Cl.
  CPC ......... *G06F 16/119* (2019.01); *G06F 3/0604* (2013.01); *G06F 3/0614* (2013.01); *G06F 3/0647* (2013.01); *G06F 3/0682* (2013.01); *G06F 16/122* (2019.01); *G06F 16/164* (2019.01)

(58) Field of Classification Search
  None
  See application file for complete search history.

(56) References Cited

U.S. PATENT DOCUMENTS

| | | | |
|---|---|---|---|
| 8,234,372 B2 | 7/2012 | Knapp et al. | |
| 9,122,647 B2 | 9/2015 | Tian et al. | |
| 11,093,476 B1* | 8/2021 | Neeman | G06F 16/951 |
| 2002/0107973 A1* | 8/2002 | Lennon | G11B 27/105 |
| | | | 725/105 |
| 2006/0090049 A1* | 4/2006 | Saika | G06F 3/0605 |
| | | | 711/165 |
| 2015/0381725 A1 | 12/2015 | Haapaoja et al. | |

(Continued)

OTHER PUBLICATIONS

Wikipedia, "Data migration," Wikipedia, updated on Sep. 19, 2019, 5 pages, retrieved from https://en.wikipedia.org/wiki/Data_migration.

(Continued)

*Primary Examiner* — Thu N Nguyen
(74) *Attorney, Agent, or Firm* — Zilka-Kotab, P.C.

(57) ABSTRACT

A computer-implemented method includes receiving custom metadata for several data items, the data items having system metadata associated therewith, selecting, based on the custom metadata, some of the data items to move between a primary storage system and a secondary storage system, and moving the selected data item(s) between the primary storage system and the secondary storage system. A computer program product includes a computer readable storage medium having program instructions embodied therewith. The program instructions are executable by a computer to cause the computer to perform the foregoing method. A system includes a processor and logic integrated with the processor, executable by the processor, or integrated with and executable by the processor. The logic is configured to perform the foregoing method.

20 Claims, 6 Drawing Sheets

(56) References Cited

U.S. PATENT DOCUMENTS

| | | | |
|---|---|---|---|
| 2016/0062671 A1* | 3/2016 | Iwasaki | G06F 3/0619 |
| | | | 707/640 |
| 2016/0260433 A1* | 9/2016 | Sumner | G06F 40/30 |
| 2017/0177649 A1* | 6/2017 | Badrinarayanan | G06F 21/64 |
| 2018/0034890 A1* | 2/2018 | Singhvi | G06F 16/13 |
| 2019/0018844 A1 | 1/2019 | Bhagwat et al. | |
| 2019/0197137 A1* | 6/2019 | Braud | G06F 16/248 |
| 2019/0253357 A1* | 8/2019 | Pathak | H04L 47/6215 |
| 2020/0159771 A1* | 5/2020 | Dain | G06F 16/907 |

OTHER PUBLICATIONS

Rouse et al., "data migration," TechTarget, Accesssed on Oct. 23, 2019, 6 pages, Retrieved from https://searchstorage.techtarget.com/definition/data-migration.

Salesforce, "Custom Metadata Types," Sales Force, Accessed on Oct. 23, 2019, 3 pages, Retrived from https://help.salesforce.com/articleView?id=custommetadatatypes_overview.htm&type=5.

Bhosale et al., U.S. Appl. No. 16/102,610, filed Aug. 13, 2018.

* cited by examiner

EVENT DRIVEN MIGRATION, RECALL, AND DATA PLACEMENT OPTIMIZATION BASED ON CUSTOM METADATA

BACKGROUND

The present invention relates to data storage systems, and more specifically, this invention relates to event driven migration, recall, and data placement optimization based on custom metadata.

Data migration is the process of selecting, preparing, extracting, transforming, etc., data and transferring the data from one storage system to another storage system. Data migration is performed in response to replacing and/or upgrading servers and/or server equipment, moving data to third-party cloud providers, website consolidation, infrastructure maintenance, application migration, software upgrades, company mergers, data center relocation, etc. Conventional data migration techniques risk compromising the integrity of the data and require significant downtime.

System metadata is used to pre-migrate, migrate, and recall data on tape. In one conventional process, system metadata such as file size, directory, files, file names, etc., is scanned via a policy engine to determine which data is eligible to migrate to tape.

SUMMARY

A computer-implemented method, according to one approach, includes receiving custom metadata for several data items, the data items having system metadata associated therewith, selecting, based on the custom metadata, some of the data items to move between a primary storage system and a secondary storage system, and moving the selected data item(s) between the primary storage system and the secondary storage system. The custom metadata provides increased control over the placement of the data.

In one optional approach of the method, the selecting includes selecting data items having particular custom metadata for co-location on the secondary storage system. Selecting data items having particular custom metadata for co-location provides more control to the application and/or to the user over which data is eligible to be stored on the secondary storage system.

In another optional approach of the method, the moving is part of a pre-migration process. The moving and pre-migration enables dynamic transfers of data items to the secondary storage system from the primary storage system in response to a request to migrate, the occurrence of a triggering event, a policy, etc.

A computer program product, according to one approach, includes a computer readable storage medium having program instructions embodied therewith. The program instructions are executable by a computer to cause the computer to perform the foregoing method.

A system, according to one approach, includes a processor and logic integrated with the processor, executable by the processor, or integrated with and executable by the processor. The logic is configured to perform the foregoing method.

Other aspects and configurations of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred configurations of systems, methods and computer program products for event driven migration, recall, and data placement optimization based on custom metadata.

In one general configuration, a computer-implemented method includes receiving custom metadata for several data items, the data items having system metadata associated therewith, selecting, based on the custom metadata, some of the data items to move between a primary storage system and a secondary storage system, and moving the selected data item(s) between the primary storage system and the secondary storage system.

In another general configuration, a computer program product includes a computer readable storage medium having program instructions embodied therewith. The program instructions are executable by a computer to cause the computer to perform the foregoing method.

In another general configuration, a system includes a processor and logic integrated with the processor, executable by the processor, or integrated with and executable by the processor. The logic is configured to perform the foregoing method.

Figure 1:
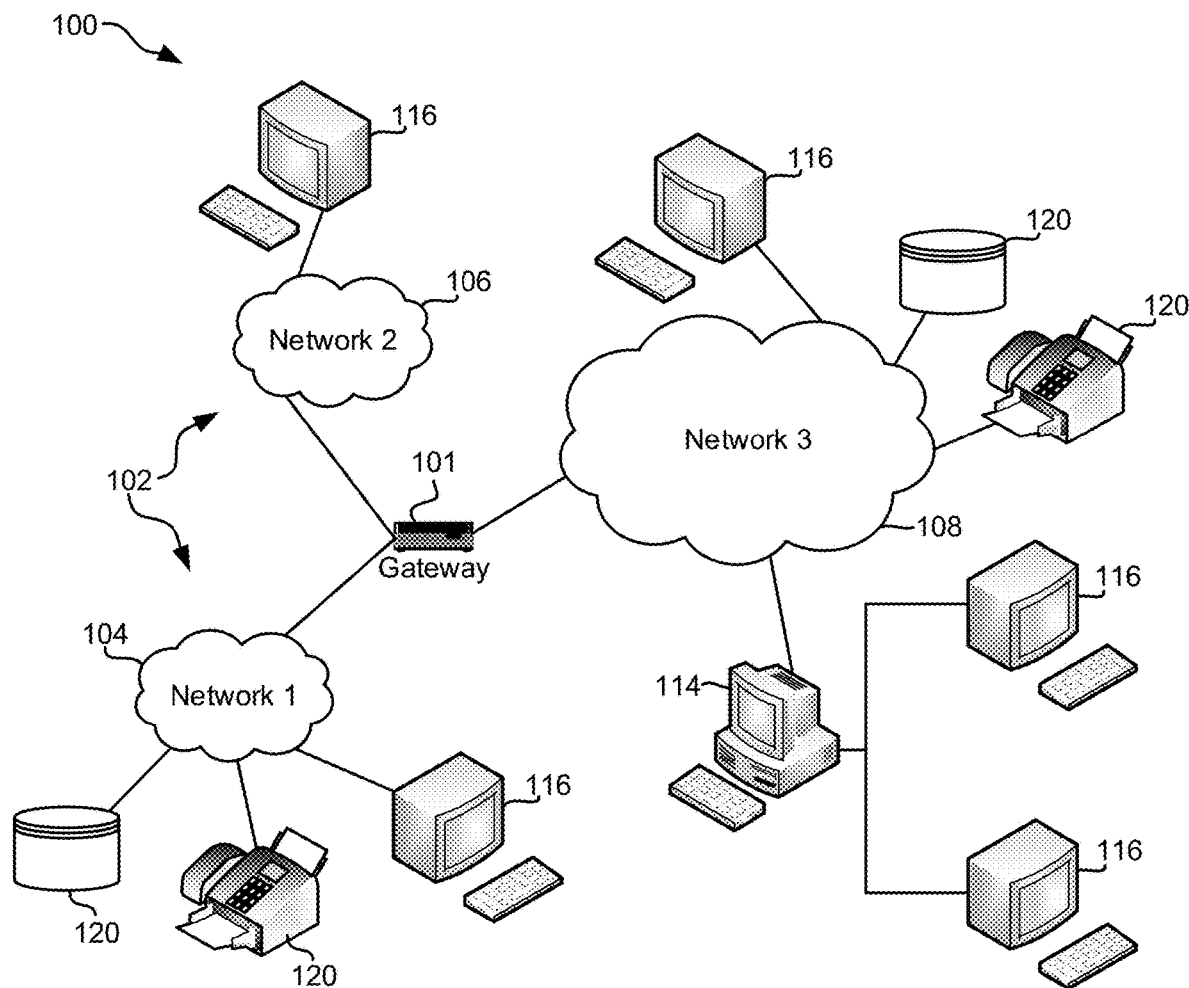
FIG. 1 illustrates a network architecture, in accordance with one configuration of the present invention.

FIG. 1 illustrates an architecture 100, in accordance with one configuration. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 116 may also be directly coupled to any of the networks, in one configuration.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX® system which emulates an IBM® z/OS® environment, a UNIX® system which virtually hosts a Microsoft® Windows® environment, a Microsoft® Windows® system which emulates an IBM® z/OS® environment, etc. This virtualization and/or emulation may be enhanced through the use of VMware® software, in some configurations.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
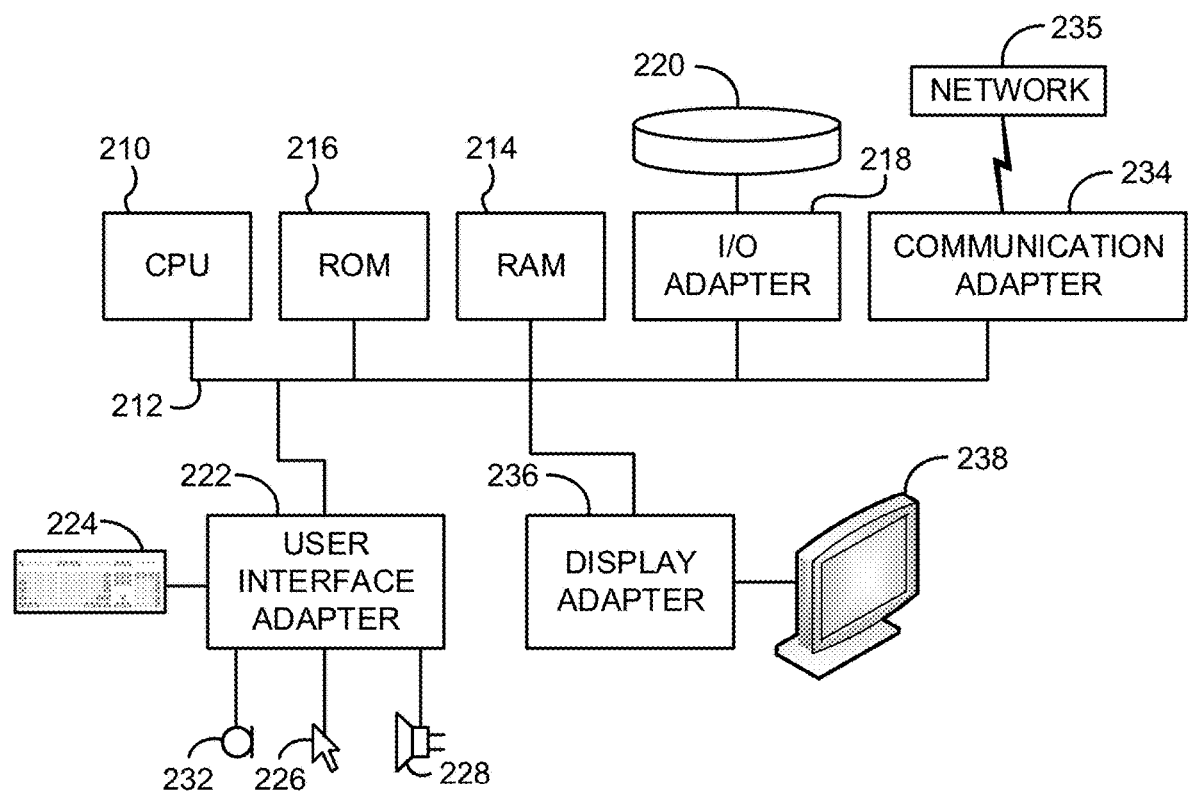
FIG. 2 shows a representative hardware environment that may be associated with the servers and/or clients of FIG. 1, in accordance with one configuration of the present invention.

FIG. 2 shows a representative hardware environment associated with a user device 116 and/or server 114 of FIG. 1, in accordance with one configuration. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft® Windows® Operating System (OS), a macOS®, a UNIX® OS, etc. It will be appreciated that a preferred configuration may also be implemented on platforms and operating systems other than those mentioned. A preferred configuration may be written using eXtensible Markup Language (XML), C, and/or C++ language, or other programming languages, along with an object oriented programming methodology. Object oriented programming (OOP), which has become increasingly used to develop complex applications, may be used.

Figure 3:
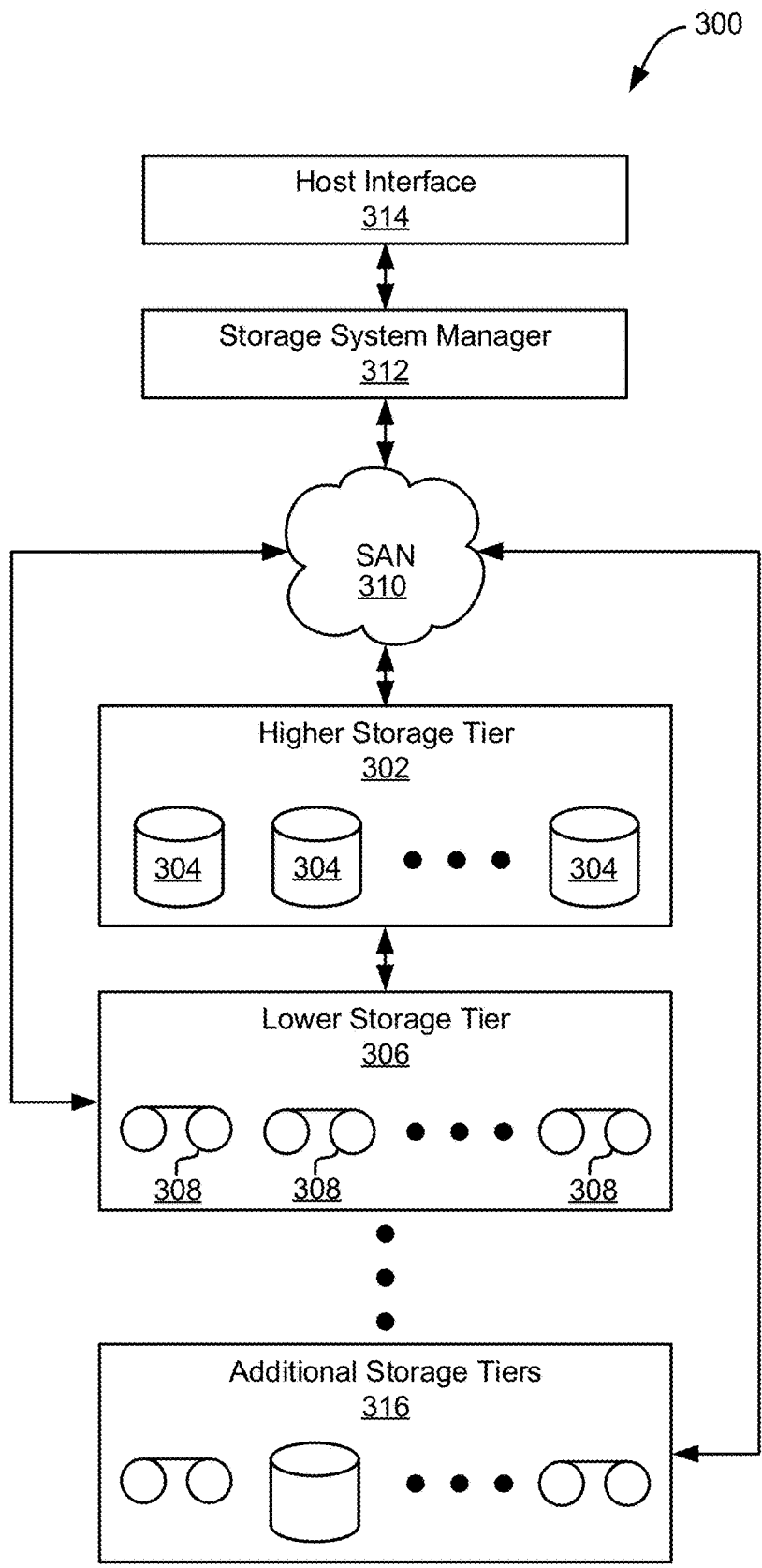
FIG. 3 illustrates a tiered data storage system in accordance with one configuration of the present invention.

Now referring to FIG. 3, a storage system 300 is shown according to one configuration. Note that some of the elements shown in FIG. 3 may be implemented as hardware and/or software, according to various configurations. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more configurations, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of ordinary skill in the art, upon reading the present descriptions, may devise many other combinations of storage media types to implement into different storage schemes, according to the configurations presented herein.

According to some configurations, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various configurations.

System metadata is used to pre-migrate, migrate, and recall data on tape. In one conventional process, system metadata such as file size, directory, files, file names, etc., is scanned via a policy engine to determine which data is eligible to migrate to tape.

Conventional systems scan the file system to obtain system metadata and then compare the system metadata against a policy to determine which data is eligible to be migrated. Conventional systems for determining data to migrate fail to reach hyperscale levels and fail to give more control to the application and/or the user over which data is eligible to be stored on tape.

In stark contrast, various approaches disclosed herein tag data items with custom metadata for controlling the placement of the data items on tape. The custom metadata may be tagged by users and/or applications in some approaches. In one approach, the custom metadata is derived from deep data inspection techniques such as extracting file headers, leveraging Watson™ Application Programming Interfaces (APIs) (International Business Machines Corporation (IBM®), 1 New Orchard Road, Armonk, N.Y. 10504-1722, United States) to inspect data, etc. The insights gained from the foregoing extraction techniques are inserted as and/or used to generate custom metadata in at least some configurations.

In some approaches, the custom metadata may be inserted into IBM Spectrum® Discover. IBM Spectrum® Discover delivers cognitive data management on a petabyte scale by capturing metadata from heterogenous storage and compute environments. Metadata is collected from block, object, and/or file storage and maintained over the lifetime of the data item. Custom metadata may be added and/or derived from the data item itself. The information gathered from various sources is mined using IBM Watson®, e.g., Watson™ Deep Learning Analytics, to deliver a cognitive solution for providing value, control, and data safeguarding.

In preferred configurations, custom metadata is used to pre-migrate selected data items from disk to tape media, migrate selected data items from disk to tape media, recall selected data items from tape media to disk, etc. The custom metadata may be used to tier data items to cloud storage instead of and/or in addition to tape media.

In at least some configurations, as data items are tagged with custom metadata, events are sent from the storage system containing the system metadata and the custom metadata and the events are normalized and inserted into a database where the information is mined to control data movement to and/or from tape media. Data items may be co-located on tape based on the custom metadata in preferred approaches.

Figure 4:
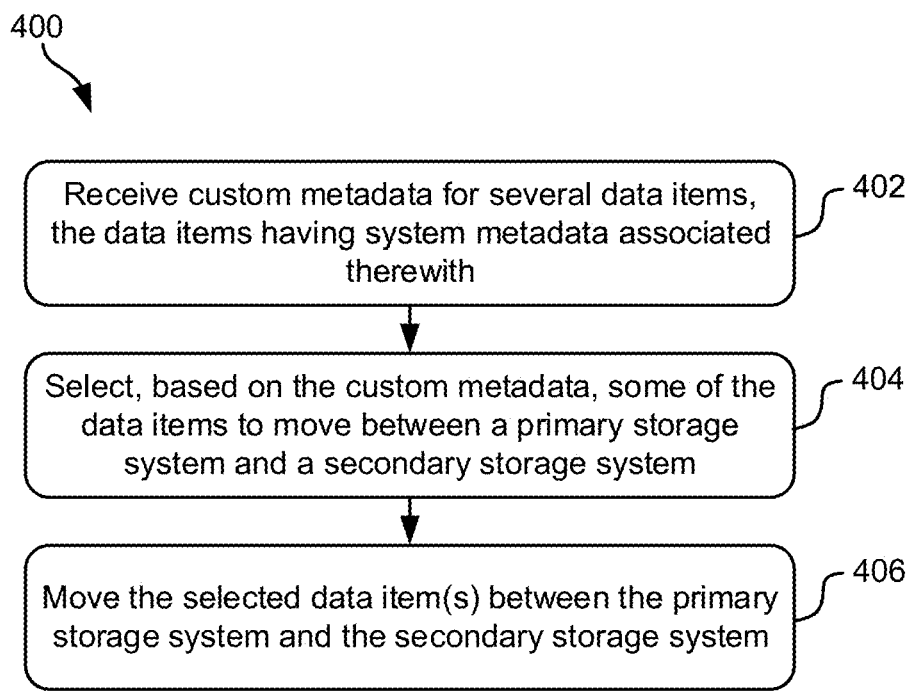
FIG. 4 is a flowchart in accordance with one configuration of the present invention.

Now referring to FIG. 4, a flowchart of a method 400 is shown according to one configuration. The method 400 may be performed in accordance with the present invention in any of the environments depicted in FIGS. 1-6, among others, in various configurations. Of course, more or less operations than those specifically described in FIG. 4 may be included in method 400, as would be understood by one of ordinary skill in the art upon reading the present descriptions.

Each of the steps of the method 400 may be performed by any suitable component of the operating environment. For example, in various configurations, the method 400 may be partially or entirely performed by computer, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 includes operation 402. Operation 402 includes receiving custom metadata for several data items. The custom metadata may be received by a user, an application, a primary storage system, a secondary storage system, a data source which is outside of a storage system, etc. Custom metadata may be received in any manner known in the art. Data items as disclosed herein may comprise files, objects, packets, records, any type of media, etc., or any combination thereof. Any metadata disclosed herein may be stored in correlation with a data item in any manner known in the art. In one approach, the metadata in correlation with the data item and/or any other relevant information may be stored in a table.

In preferred configurations, the data items have system metadata associated therewith. System metadata may include descriptive metadata, structural metadata, administrative metadata, reference metadata, statistical metadata, timestamp metadata, location metadata, user metadata, or any other type of metadata known in the art.

In a preferred configuration, custom metadata is any information specified by a user, an application, a service provider, a content provider, a default setting, etc. The custom metadata preferably provides information for moving, storing, managing, identifying, classifying, recalling, migrating, pre-migrating, etc., the data item. For example, in a university research facility comprising simulation labs, custom metadata may be set to include simulation IDs, sequence numbers, dates associated with each simulation, researchers involved in the simulation, etc.

In one approach, the custom metadata is created within a primary storage system. In another approach, the custom metadata may be created outside a storage system.

In one configuration, at least some of the custom metadata is created by deep data inspection techniques. Deep data inspection techniques may include any text, visual, audio, speech-to-text, etc., analysis techniques known in the art.

For example, any known technique may be used to perform natural language processing of the data items including Google® Natural Language, Natural Language Toolkit, Apache Lucene Core™ Software, Apache OpenNLP™ Software, CoreNLP, spaCy®, etc. In a preferred approach, the natural language processing is performed using Watson™ Natural Language Understanding, Watson™ Tone Analyzer, and/or Watson™ Natural Language Classifier.

In another example, analyzing image data items may include using visual recognition techniques (e.g., when the data item includes one or more images and/or video, etc.). Visual recognition analysis may be performed using Google Image Recognition, Amazon Rekognition®, Clarifai®, Ditto Labs, Brandwatch® Image Insights, GumGum®, LogoGrab®, IBM® Image Detection, or any visual recognition analysis software known in the art. In an exemplary approach, the visual recognition software for performing the visual recognition analysis is Watson™ Visual Recognition API. Any known technique in the art for analyzing image data may be used.

In another example, analyzing audio data items may be performed using Audacity®, Seewave®, TuneR, Pachyderm, Raven Pro, Avisoft SASLab Pro, Adobe® Audition® or any audio data analysis software known in the art. In an exemplary approach, the audio data analysis software for performing the audio data analysis is Watson™ Natural Language Understanding. Any known technique in the art for analyzing audio data items may be used.

In yet another example, analyzing various data items includes analyzing speech-to-text data (e.g., when the data item includes audio, etc.). Speech-to-text analysis may be performed using Castel Detect LIVE, Yactraq, Braina, Sonix, SpeechTexter, Windows® Speech Recognition, Google Docs™ Voice Typing, Dragon™ NaturallySpeaking™, Siri®, Cortana®, Google Now™, Speech Recogniser, ListNote®, Gboard®, or any speech-to-text analysis software known in the art. In an exemplary approach, the audio data analysis software for performing the audio data analysis is Watson™ Speech to Text. Any known technique in the art for analyzing speech-to-text data may be used. Additional techniques may include closed captioning processing, textual processing, natural language processing, etc.

In another approach, creating the custom metadata includes performing one or more of content analytics and/or sentiment analytics on the data item to determine metadata associated with the data item. In another aspect, creating the custom metadata may include performing natural language classification on one or more aspects of the data item (e.g., a name of the data item, text included within metadata for the data item, text included within the data item itself, etc.).

In more approaches, any combination of the foregoing text, image, audio, speech-to-text, etc., data analysis techniques may be used as deep data inspection techniques for creating the custom metadata. Any other of the foregoing text, image, audio, speech-to-text, etc., data analysis techniques known in the art may be used as deep data inspection techniques for creating the custom metadata.

In various approaches, the custom metadata may be created and/or updated according to a predetermined schedule. For example, all data items may be analyzed in order to determine custom metadata for the data item. In another example, the creation and/or updating may occur at a predetermined interval, according to a schedule, on-demand, in response to an event as described herein, etc.

In one approach, receiving the custom metadata includes receiving events for the data items. Events for the data items may include assigning custom metadata to the data items, updating the data items, deleting the data items, writing data items, merging data items, etc. In preferred configurations, the events comprise system metadata associated with the data items.

In some configurations, the events may be put into a persistent message queue where the events are read from the queue. The event may be received or removed from the queue to ensure that the ordering of the event is guaranteed. For example, in one aspect, the ordering of the events may include assigning each data item a unique key where all unique keys go to the same queue topic in the order in which the unique keys are received and where the unique keys are subsequently pulled in order. The unique key may be separate from the custom metadata. In one aspect, an event queue (e.g., IBM® Kafka®) may be used. Various consumers may read the events from the queue, normalize them, and insert them into a highly scalable database. In some approaches, the highly scalable database may be a sequential query language database (SQL DB). The events may be normalized where any associated size, name, storage device, and other fields may each be normalized into common fields. The events may be normalized according to any approach discussed in detail below. In preferred approaches, the events are inserted into a highly scalable database.

The foregoing approach may comprise adding the custom metadata to a database. The database may be any database known in the art. In preferred approaches, the events and the custom metadata are added to the same database.

In one configuration, a normalized version of the custom metadata may be added to a database. A normalized version of the custom metadata may include normalizing the units of the custom metadata for each data item such that the custom metadata is in one format. For example, normalizing the custom metadata may include converting all the custom metadata to a text format in one approach. In various approaches, normalizing the custom metadata includes converting the custom metadata for each data item into a single string of alphanumeric characters. In other approaches, normalizing the custom metadata includes assigning weights to custom metadata associated with at least some of the data items. Any normalization technique known in the art may be used, including, but not limited to, standard scores, residuals, standardized moments, coefficient of variation, min-max feature scaling, assigning percentiles, probability density functions, etc.

Operation 404 includes selecting, based on the custom metadata, some of the data items to move between a primary storage system and a second storage system. A primary storage may be the source of the data items, a higher tier in a hierarchical storage system, etc. A secondary storage may be a storage system other than the primary storage, e.g., a lower tier and/or cloud storage if migrating down. In other approaches, a secondary storage may be the source of the data items, a higher tier in a hierarchical storage system, etc., if migrating up, and the primary storage may be a storage system other than the primary storage.

In one configuration, the selecting includes selecting data items having particular custom metadata for co-location on the secondary storage system. Data items having particular custom metadata for co-location may include data items with substantially similar custom metadata, custom metadata having the same format, data items of the same type, data items which are determined to be related in any manner known in the art, etc. In other approaches, selecting data items having particular custom metadata for co-location may be performed by a user, an application, a service provider, a content provider, a default setting, predefined policies, etc.

In one approach, the selected data items are co-located in a single tape library. In another approach, the selected data items are co-located on the same magnetic recording tape. Selected data items which are co-located on the same magnetic recording tape may be co-located in the same tape drive, tape cartridge, tape library, etc., as would be understood by one having ordinary skill in the art upon reading the present disclosure.

Operation 406 includes moving the selected data item(s) between the primary storage system and the secondary storage system. The selected data items may be moved in any manner known in the art. In preferred approaches, the custom metadata is used to control the placement of data item in the secondary storage system.

In one configuration, the moving is part of a pre-migration process. Pre-migrating the data items enables dynamic transfers of data items to the secondary storage system from the primary storage system in response to a request to migrate, the occurrence of a triggering event, a policy, etc. The custom metadata may be used to pre-migrate data items from disk to tape in at least some approaches. Pre-migration may include conditionally migrating the data from the primary storage system to the second storage system based on the custom metadata. In one approach, data items may be pre-migrated according to one or more policies associated with the data item. In another approach, a policy implemented within a storage system may indicate that data items having particular custom metadata are to be stored in a particular storage system.

In another configuration, the moving is part of a migration process. The custom metadata may be used to migrate data from disk to tape in at least some approaches. In preferred approaches, moving the selected data items between the primary storage system and the secondary storage system is dynamic based on the custom metadata and/or one or more preexisting policies.

In yet another configuration, the moving is part of a recall process. The custom metadata may be used to recall data from tape to disk in at least some approaches.

In various aspects, a table maps custom metadata, data items, and storage systems associated with the data items. In some approaches, the mapping may be used to pre-migrate, migrate, recall, etc., data items with custom metadata matching any pre-mapped association.

In one approach, the key-value store (e.g., the database) is queried. The query may be for determining the content of the data item associated with custom metadata, the content of the data item to be migrated, the content of the data item to be co-located, etc. In response to a query, the method includes receiving a list of data items associated with custom metadata which is associated with the query. The data items may be pre-migrated, migrated, recalled, co-located, etc., in response to the query.

In other approaches, a storage system may register an event consumer in the database and directly receive events from storage pertaining to which data items have been modified as well as what is in the files via the various deep data inspection techniques described herein, in order to eliminate the database queries and trigger instantaneous migration of the data items.

In some approaches, some of the data items are selected and moved in response to determining that the custom metadata in the events associated with the some of the data items matches a predefined policy. For example, policies may trigger deep data inspection (e.g., leveraging Watson™ techniques) that extract facets from the data items, and the facets may be indexed into IBM Spectrum® Discover or any cognitive data management module known in the art. The system may query the cognitive data management module to identify data items associated with custom metadata which is relevant to the query. The cognitive data management module may trigger a job for cognitive insights of certain data items based on live events and may help identify the data items to be migrated and/or co-located, in near real-time in a highly scalable and high performant fashion.

Figure 5:
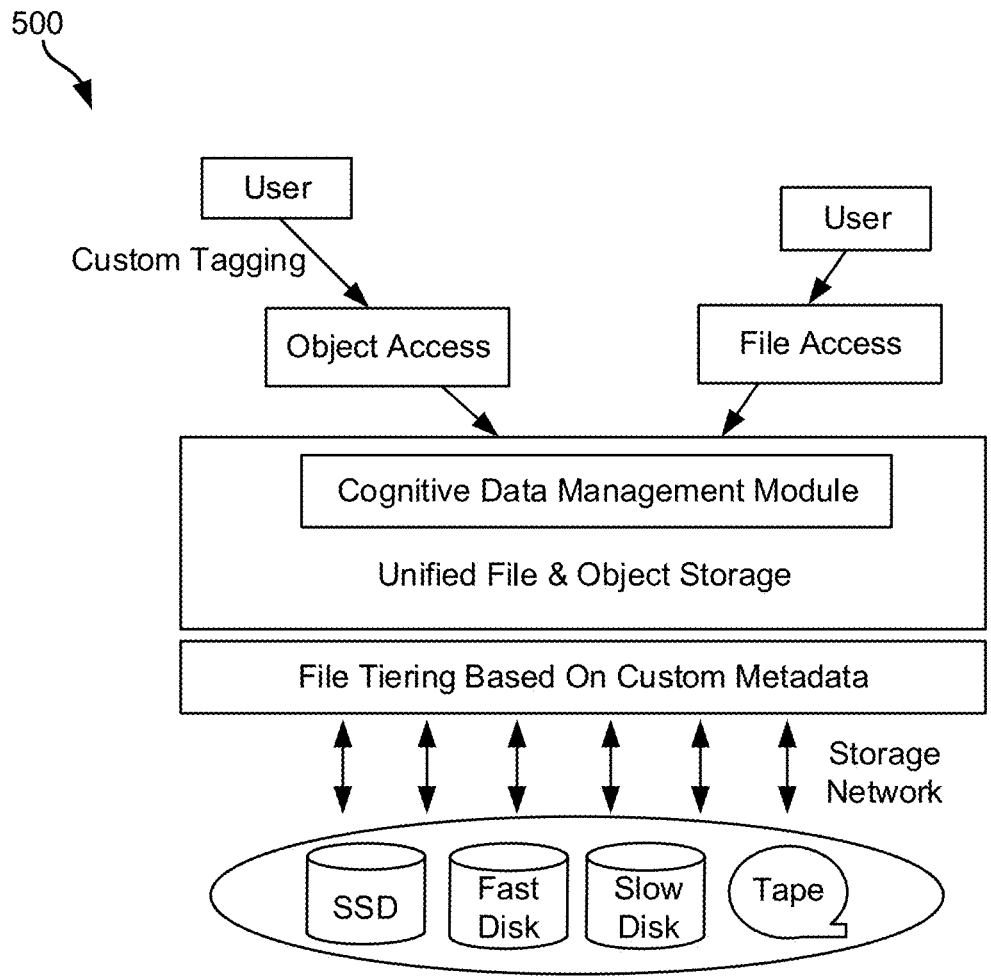
FIG. 5 is an exemplary implementation in accordance with one configuration of the present invention.
Figure 5:
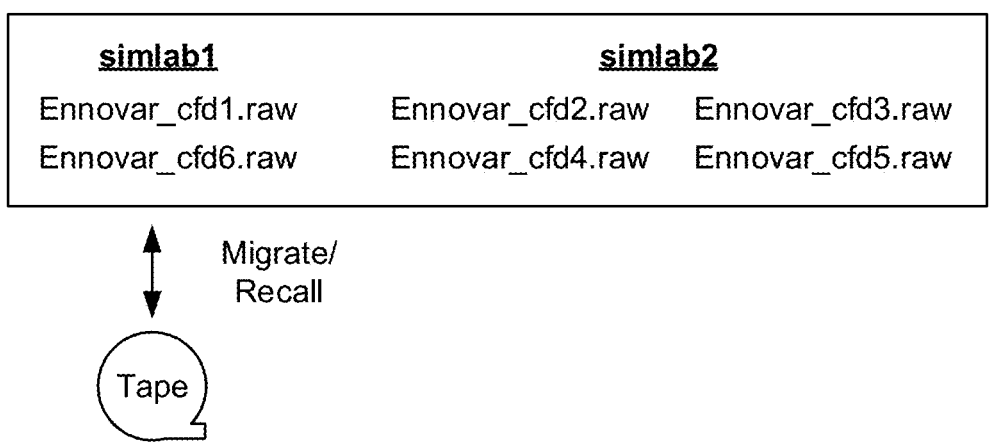

FIG. 5 depicts an exemplary implementation 500 of the foregoing method 400, in accordance with one configuration. As an option, the present implementation 500 may be implemented in conjunction with features from any other configuration listed herein, such as those described with reference to the other FIGS. Of course, however, such implementation 500 and others presented herein may be used in various applications and/or in permutations which may or may not be specifically described in the illustrative configurations listed herein. Further, the implementation 500 presented herein may be used in any desired environment.

In this exemplary implementation, a university runs a computational fluid dynamics simulations for aviation scenarios. The university may comprise a plurality of users which may perform custom tagging of data items (e.g., objects, files, etc.) according to any of the techniques discussed in detail above. The university in implementation 500 comprises two labs, simlab1 and simlab2. Each computation fluid dynamics (CFD) output file (e.g., data item) is tagged with the corresponding simulation lab (e.g., simlab1 and simlab2), the simulation ID and/or sequence numbers, the data of the simulation, etc. (e.g., the custom metadata). The custom metadata and/or data items may be stored in a storage system. Specifically, the custom metadata and/or data items may be indexed by a cognitive data management module for storage in the storage system. In one exemplary approach, the cognitive data management module is IBM Spectrum® Discover. The files may be tiered, migrated, recalled, etc., based on the custom metadata according to at least some of the operations discussed with respect to method 400.

In contrast to conventional tagging mechanisms which only use system metadata and file system scans to determine which data to migrate to tape, the present implementation 500 leverages the custom metadata to determine which files from simlab1 to migrate to tape. The implementation 500 further co-locates files tagged with simlab1 on tape. The custom metadata may be leveraged to recall the data from the tape.

In one approach, further analysis on the aviation simulation information may be performed at a later time by leveraging the custom metadata to search and/or identify aviation data to be recalled from tape.

Figure 6:
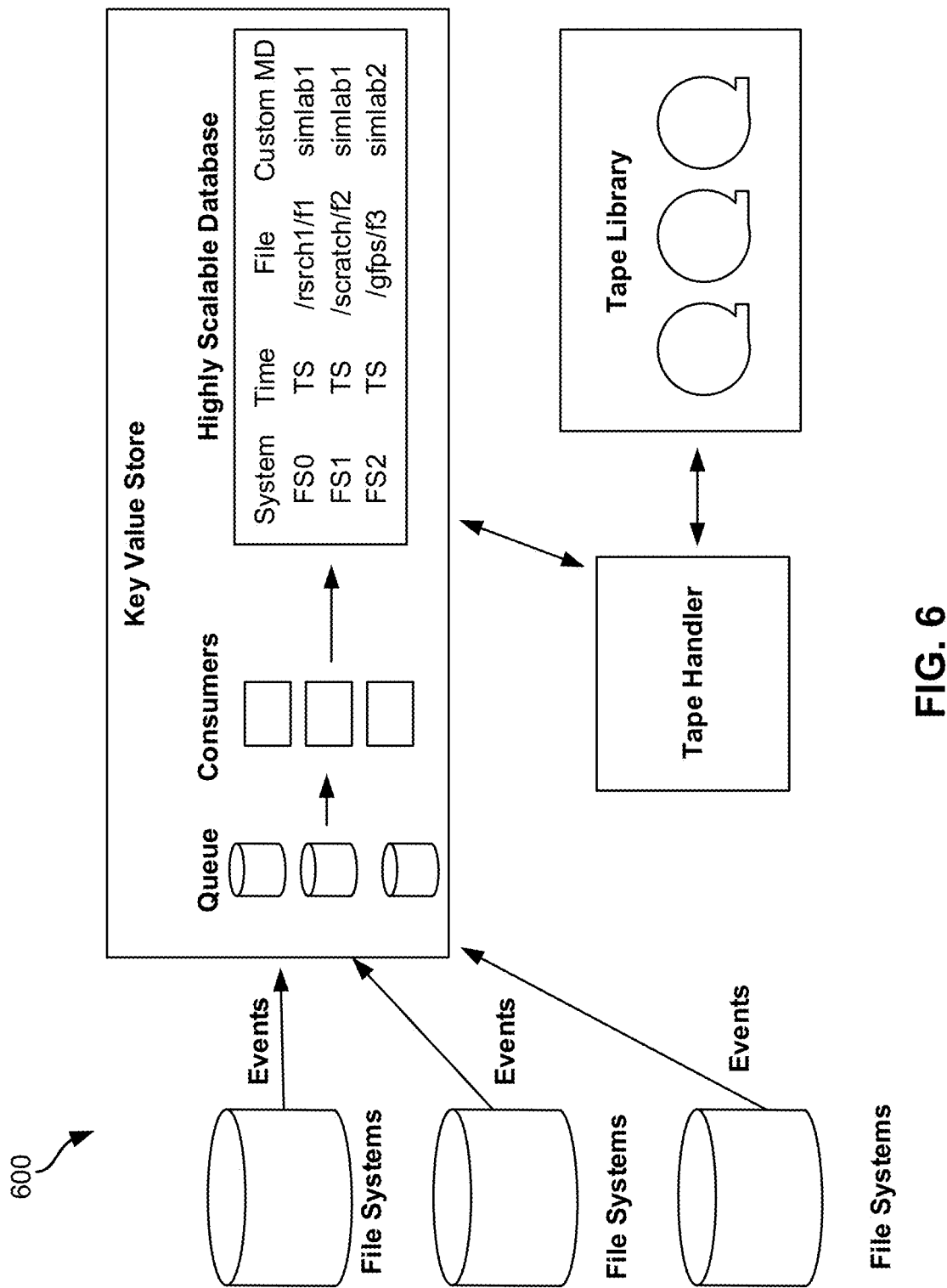
FIG. 6 is an exemplary implementation in accordance with one configuration of the present invention.

FIG. 6 depicts an exemplary implementation 600 of the foregoing method 400, in accordance with one configuration. As an option, the present implementation 600 may be implemented in conjunction with features from any other configuration listed herein, such as those described with reference to the other FIGS. Of course, however, such implementation 600 and others presented herein may be used in various applications and/or in permutations which may or may not be specifically described in the illustrative configurations listed herein. Further, the implementation 600 presented herein may be used in any desired environment.

Files and/or objects are tagged by a user and/or application with custom metadata according to the various operations discussed above with reference to method 400. As shown in implementation 600, the custom metadata is simlab1 and simlab2. The file systems send events containing the system metadata and the custom metadata to be inserted onto a persistent queue. The data is stored in a key value store by a consumer that pulls the event off the queue, normalizes the event, and inserts the event into a highly scalable database (e.g., a sequential query language database (SQL DB). The events may include the primary storage system (e.g., the origin of the event and/or an associated data item), the timestamp (TS) associated with the event, the file name, the custom metadata, etc. A tape handler module issues a query against the queue to retrieve a list of files associated with the custom metadata value of simlab1 and migrates these files to tape in the tape library in a co-located manner.

In another approach of implementation 600, the tape handler may be embedded as a consumer in the queue. Events may be read directly off of the queue. The events may be checked for the custom metadata and the data may be migrated to tape based on the custom metadata.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some configurations, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to configurations of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various configurations of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various configurations may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that configurations of the present invention may be provided in the form of a service deployed on behalf of a customer to offer service on demand.

The descriptions of the various configurations of the present invention have been presented for purposes of illustration, but are not intended to be exhaustive or limited to the configurations disclosed. Many modifications and variations will be apparent to those of ordinary skill in the art without departing from the scope and spirit of the described configurations. The terminology used herein was chosen to best explain the principles of the configurations, the practical application or technical improvement over technologies found in the marketplace, or to enable others of ordinary skill in the art to understand the configurations disclosed herein.

What is claimed is:

1. A computer-implemented method, comprising:
receiving custom metadata for several data items, the data items having system metadata associated therewith;
selecting, based on the custom metadata, some of the data items to move between a primary storage system and a secondary storage system; and
moving the selected data item(s) between the primary storage system and the secondary storage system, wherein the custom metadata is used to control placement of the data item(s) in the secondary storage system; and
adding the custom metadata to a database,
wherein receiving the custom metadata includes receiving events for the data items,
wherein the custom metadata and the events are added to the same database.

2. The computer-implemented method of claim 1, wherein the selecting includes selecting data items having particular custom metadata for co-location on the secondary storage system.

3. The computer-implemented method of claim 2, wherein the selected data items are co-located in a single tape library based on the particular custom metadata.

4. The computer-implemented method of claim 2, wherein the selected data items are co-located on the same magnetic recording tape based on the particular custom metadata.

5. The computer-implemented method of claim 2, wherein the particular custom metadata for co-location on the secondary storage system is selected from the group consisting of: substantially similar custom metadata, custom metadata having the same format, and custom metadata indicating data items of the same type.

6. The computer-implemented method of claim 1, wherein some of the data items are selected and moved in response to determining that the custom metadata in the events associated with the some of the data items matches a predefined policy.

7. The computer-implemented method of claim 1, wherein the moving is part of a pre-migration process.

8. The computer-implemented method of claim 1, wherein the moving is part of a migration process.

9. The computer-implemented method of claim 1, wherein the moving is part of recall process.

10. A computer program product, the computer program product comprising a computer readable storage medium having program instructions embodied therewith, the program instructions executable by a computer to cause the computer to:
receive, by the computer, custom metadata for several data items, the data items having system metadata associated therewith;
select, by the computer, based on the custom metadata, some of the data items to move between a primary storage system and a secondary storage system,
wherein the selecting includes selecting data items having particular custom metadata for co-location on the secondary storage system,
wherein the particular custom metadata for co-location on the secondary storage system is selected from the group consisting of: substantially similar custom metadata, custom metadata having the same format, and custom metadata indicating data items of the same type;
move, by the computer, the selected data item(s) between the primary storage system and the secondary storage system, wherein the custom metadata is used to control placement of the data item(s) in the secondary storage system; and
add, by the computer, the custom metadata to a database, wherein the moving is part of a migration process.

11. The computer program product of claim 10, wherein the selected data items are co-located in a single tape library.

12. The computer program product of claim 10, wherein the selected data items are co-located on the same magnetic recording tape.

13. The computer program product of claim 10, wherein at least some of the custom metadata is created by a deep data inspection technique selected from the group consisting of: natural language processing, a visual recognition technique, and speech-to-text analysis.

14. The computer program product of claim 10, wherein receiving the custom metadata includes receiving events for the data items.

15. The computer program product of claim 14, wherein some of the data items are selected and moved in response to determining that the custom metadata in the events associated with the some of the data items matches a predefined policy.

16. The computer program product of claim 10, wherein the moving is part of a pre-migration process.

17. A system, comprising:
    a processor; and
    logic integrated with the processor, executable by the processor, or integrated with and executable by the processor, the logic being configured to:
    receive custom metadata for several data items, the data items having system metadata associated therewith, wherein receiving the custom metadata includes receiving events for the data items;
    select, based on the custom metadata, some of the data items to move between a primary storage system and a secondary storage system; and
    move the selected data item(s) between the primary storage system and the secondary storage system, wherein the custom metadata is used to control placement of the data item(s) in the secondary storage system,
    wherein receiving the custom metadata includes receiving events for the data items,
    wherein the custom metadata and the events are added to the same database.

18. The system of claim 17, wherein at least some of the custom metadata is created by a deep data inspection technique selected from the group consisting of: natural language processing, a visual recognition technique, and speech-to-text analysis.

19. The system of claim 17, wherein some of the data items are selected and moved in response to determining that the custom metadata in the events associated with the some of the data items matches a predefined policy.

20. The system of claim 17, wherein the selecting includes selecting data items having particular custom metadata for co-location on the secondary storage system.

\* \* \* \* \*